US006868502B2

(12) United States Patent
Wei et al.

(10) Patent No.: US 6,868,502 B2
(45) Date of Patent: Mar. 15, 2005

(54) COMBINATION ANALOG AND DIGITAL MODEM

(75) Inventors: Du Wei, Harris County, TX (US); Ting Sun, Harris County, TX (US); Robert F. Watts, Harris County, TX (US); Ramakrishna Anne, Harris County, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 09/947,718

(22) Filed: Sep. 6, 2001

(65) Prior Publication Data

US 2002/0010818 A1 Jan. 24, 2002

Related U.S. Application Data

(63) Continuation of application No. 09/173,232, filed on Oct. 15, 1998.

(51) Int. Cl.[7] .............................................. H04M 11/00
(52) U.S. Cl. ................. 713/340; 379/90.01; 379/93.05; 379/93.28; 379/102.04
(58) Field of Search .......................... 713/340; 710/69; 379/90.01, 93.05, 93.28, 102.04

(56) References Cited

U.S. PATENT DOCUMENTS

| | | | | |
|---|---|---|---|---|
| 4,785,448 A | | 11/1988 | Reichert et al. ............... 370/76 |
| 5,479,480 A | * | 12/1995 | Scott ........................... 379/59 |
| 5,671,251 A | * | 9/1997 | Blackwell et al. .......... 375/222 |
| 5,778,024 A | * | 7/1998 | McDonough ............... 375/216 |
| 5,878,078 A | * | 3/1999 | Griffin et al. ................ 375/222 |
| 5,898,920 A | * | 4/1999 | Jacobs ...................... 455/553.1 |
| 6,101,398 A | * | 8/2000 | Joong et al. ................. 455/557 |
| 6,131,136 A | * | 10/2000 | Liebenow et al. .......... 710/316 |
| 6,212,263 B1 | * | 4/2001 | Sun et al. ................. 379/93.28 |

OTHER PUBLICATIONS

XL12000 High Speed Network Modem; Tut Systems, Inc.; 2495 Estand Way, Pleasant Hill, CA 94523; Doc. No. DS12KV2; Jul., 1997.

(List continued on next page.)

Primary Examiner—A. Elamin

(57) ABSTRACT

A combination modem including at least one line connector that is configured for coupling to a transmission medium, analog modem logic that is capable of performing analog modem communications via the transmission medium, digital modem logic that is capable of performing digital modem communications via the transmission medium, a bus interface that enables communication with a computer via an expansion bus of the computer, and processing logic. In this manner a single modem expansion card supports both analog and digital modem technologies using only one slot of an expansion bus of the computer. The analog modem logic may support 56K technologies, such as K56Flex™, V.90, etc., or any combination thereof. The digital modem logic may be according to any type of xDSL, such as ADSL, or U-ADSL, etc. The modem may operate as an analog modem, a digital modem, or as both at the same time with or without a POTS splitter. A single digital signal processor (DSP) located on the modem card may be used to support either the analog or the digital modem communications at any given time or both at the same time. The modem card may be configured as a PCI card for plugging into a PCI bus of the computer.

35 Claims, 12 Drawing Sheets

OTHER PUBLICATIONS

XL18000 Long Distance Network Modem; Tut Systems, Inc.; 2495 Estand Way, Pleasant Hill, CA 94523; Doc. No. DS182KV2; Jul., 1997.

XL15000 10 Mbps Network Extension; Tut Systems, Inc.; 2495 Estand Way, Pleasant Hill, CA 94523; Doc. No. DS1500V2; Jul., 1997.

XL600 10 Mbps Network Extension; Tut Systems, Inc.; 2495 Estand Way, Pleasant Hill, CA 94523; Doc. No. DSXL600V2; Jul., 1997.

MB Series Ethernet Repeaters; Tut Systems, Inc.; 2495 Estand Way, Pleasant Hill, CA 94523; Doc. No. DSMBSV2; Jul., 1997.

Johnson, Mary; "Tut's Uncommon Net Link"; LAN Times, vol. 12, Issue 26; Copyright by McGraw–Hill, Inc.; Dec. 18, 1995 (to order call 612/582–3800).

Tut Systems' Products Internet Access: http://www.tutsys.com/html/products.html; 2495 Estand Way, Pleasant Hill, CA 94523; Jul., 1997.

McBinity, Meg; "Wired for Data—HomeRun squeezes more out of in–house wiring"; *tele.com,* Aug. 1997 http://www-.tutsys.com/html/wirefordata.html; Tut Systems; 2495 Estand Way, Pleasant Hill, CA 94523; Jul., 1997.

HR1300T; Tut Systems'HomeRun™; 2495 Estand Way, Pleasant Hill, CA 94523; Doc. No. DSHRHECV1; May, 1997.

* cited by examiner

COMBINATION ANALOG AND DIGITAL MODEM

CROSS REFERENCE TO RELATED APPLICATIONS

The present application is a continuation of and claims priority to U.S. application Ser. No. 09/173,232, filed Oct. 15, 1998, entitled "A Combination Analog and Digital Modem" by Wei Du, et al, which is hereby incorporated by reference in its entirety.

FIELD OF THE INVENTION

The present invention relates to a combination modem that supports both analog and digital modem formats.

DESCRIPTION OF THE RELATED ART

Many personal computer systems (PC's) are sold with, or have the ability to add, a communication device such as a digital or analog modem or the like that enables communication with an external network via telephone wires from the home. The most common external network is the Internet, although other networks including broadband networks, public networks and wide area networks (WANs) are contemplated. Dial-up modem analog modem technology is relatively easy to install and comfortable for the end user to use and currently operates up to a common data rate of approximately 56K bits per second (bps). Current 56K technologies include the K56Flex™ Standard and the ITU (International Telecommunications Union) V.90 Standard. A 56K bps dial-up modem provides a significant increase in speed as compared to a 14.4K bps modem and is faster than a 28.8K bps modem, although the actual modem speed achieved is directly proportional to the quality of the channel characteristics of the voice band signal in a given home location. At the present time, few, if any, of the Internet Service Providers (ISP) are guaranteeing the actual rate for the end user.

In spite of advances in dial-up technology, the explosive popularity of the Internet has caused consumers to become frustrated by the relatively slow speed of their connection using analog modems. The Integrated Services Digital Network (ISDN) service has been used at some home sites and small businesses and offers somewhat higher speed access. However, access charges for ISDN are still high for the average consumer and it is not available everywhere. Also, each customer's loop must first be qualified in order to be connected.

Digital Subscriber Loop (DSL) technology, particularly the asymmetrical DSL (ADSL), is beginning to emerge as the technology of choice to provide broadband access to consumers. A digital class of modems supporting ADSL provides significantly higher speed than either analog modems or ISDN devices. Furthermore, ADSL does not require a different type of transmission media such as an ISDN line or the like. Full rate ADSL is described in the proposed T1.413 issue 2 standard by ANSI (American National Standards Institute, Inc.) for telecommunications. The Universal ADSL (UAWG) is an organization of telecommunications and computer companies that are advocating and supporting the use of an alternative ADSL standard referred to as Universal ADSL (U-ADSL) or ADSL "Lite" technology that operates at approximately 1.5 megabits per second (Mbps). ITU is proposing an international standard referred to as "G.Lite" that is substantially similar to U-ADSL.

Digital and analog modems have typically been treated as two different communication devices and thus have been designed on separate platforms. While analog modems are currently the primary supported platform, ADSL is becoming more prominent and may soon be the platform of choice for data connections. An analog modem is still desired to maintain certain types of communications, such as facsimile communications. Many consumers will require, therefore, that both platforms coexist inside their personal computers (PCs). In order to support both platforms, two separate expansion cards have been necessary requiring two separate slots in the PC. This reduces PC expandability, increases the overall cost and wastes valuable PC resources.

It is desired to provide a combined solution to offer both analog and digital modem communications using an efficient form factor without wasting PC resources.

SUMMARY OF THE INVENTION

A combination modem according to the present invention includes at least one line connector that is configured for coupling to a transmission medium, analog modem logic coupled to the line connector that is capable of performing analog modem communications via the transmission medium, digital modem logic coupled to the line connector that is capable of performing digital modem communications via the transmission medium, a bus interface that enables communication with a computer via an expansion bus of the computer, and processing logic coupled to the analog modem logic, the digital modem logic and the bus interface. In this manner a single modem supports both analog and digital modem technologies. This is particularly desirable in an expansion card format where both technologies are supported on the same expansion card using only one slot of an expansion bus.

The analog modem logic may include a data access arrangement (DAA) coupled to the line connector and an analog modem codec coupled to the DAA and the processing logic. In one embodiment, the DAA and the analog modem codec operate up to approximately 56 kilobits per second (56K bps). For example, the analog portion may operate according to any analog modem standard, such as the K56Flex™ Standard or the ITU (International Telecommunications Union) V.90 Standard or any combination of these standards.

The digital modem logic may comprise an analog front end (AFE) coupled to the line connector and a digital modem codec coupled to the AFE and the processing logic. The AFE, also referred to as a transceiver, may further comprise a line driver, a receiver and hybrid echo rejection circuitry. In embodiments described herein, the AFE and the digital modem codec operate according to any type of digital subscriber loop (xDSL) technology. For example, the digital portion may operate according to asymmetrical digital subscriber loop (ADSL) or the universal asymmetrical digital subscriber loop (U-ADSL) technology.

The expansion bus is preferably a peripheral component interconnect (PCI) bus where the bus interface operates according to a PCI standard. It is noted that a PCI bus is generally capable of handling 56K analog modem communications or ADSL modem communications. Further, the PCI bus is capable of handling both 56K analog and ADSL modem communications simultaneously. The processing logic may comprise a digital signal processor (DSP) or the like. In a particular embodiment described herein, a DSP is chosen that incorporates the bus interface. The DSP may be of any type that is capable of handling either 56K analog or ADSL modem communications. In this manner, the modem may operate as either an analog modem or a digital modem. The DSP may also be of any type that is capable of simultaneously handling both 56K and ADSL modem communications.

The modem may be used in a home location with or without a POTS splitter installed. The line connector may include at least two different connectors including a first line connector coupled to the analog modem logic and a second line connector coupled to the digital modem logic. Further, a switch or like may be provided and coupled between the first and second line connectors that operates to couple the first and second line connectors together when closed and that operates to isolate the first and second line connectors when opened. In this manner, the modem may be used at a home location including a POTS splitter that separates the transmission medium into a first line for analog communications and a second line for digital communications. For example, the first line may be a POTS line used for the analog modem portion, such as 56Kbps, while the second line may be used for the digital modem portion, such as according to ADSL. The switch is opened to electrically isolate (and/or physically separate) the analog and digital portions. Alternatively, the modem may be used at a splitterless home location (without a POTS splitter) where analog and digital modem communications coexist or are otherwise combined on the same physical line. In this latter case, the switch is closed so that the combined communications are provided to both the analog and digital portions.

A combination modem according to the present invention is preferably configured as an expansion card for plugging into a slot of an expansion bus of a computer system. The computer system includes a bus system including the expansion bus, a processor and a memory system. The combination modem is configured in a similar manner as described above. The expansion bus is preferably a PCI bus, where the modem is configured as a PCI card for plugging into a PCI slot of the PCI bus. The computer system preferably includes analog modem driver software, executed by the processor from the memory system, that cooperates with the analog modem logic to perform the analog modem communications. Further, the computer system includes digital modem driver software, executed by the processor from the memory system, that cooperates with the digital modem logic to perform the digital modem communications.

It is now appreciated that a combined modem solution according to the present invention offers both analog and digital modem communications using an efficient form factor without wasting PC resources. Depending upon the configuration of the modem and the computer software, the modem may operate as an analog modem, a digital modem, or as both at the same time. A user may use the combination modem to access broadband networks or WANs using the faster ADSL technology and may use the same modem to access narrowband networks, such as via the public switched telephone network (PSTN) or the like, using the traditional analog technology. An example of a desired use of an analog modem is to send and receive facsimiles using the computer or PC.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
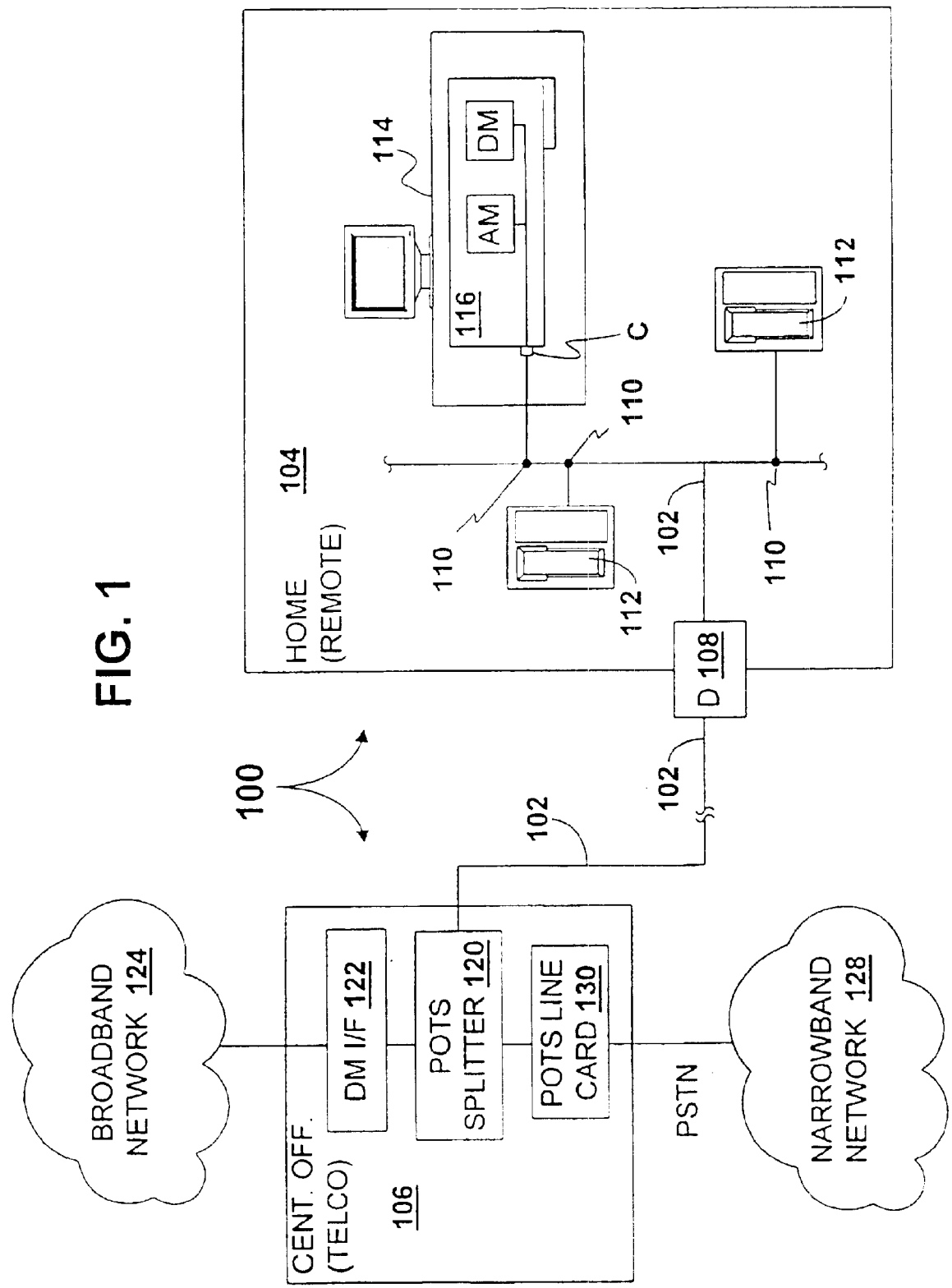
FIG. 1 is a block diagram of a communication system including a modem implemented according to the present invention at a splitterless home location.

Referring now to FIG. 1, a block diagram is shown of a communication system 100 including a combination modem 116 implemented according to the present invention. A home location 104 is wired with a transmission medium 102, such as standard four wire twisted-pair telephone lines commonly used in homes throughout the United States. In the embodiment shown, the transmission medium 102 comprises telephone wires routed from a central office 106 of the telephone company (Telco) to the home site 104 establishing an unbroken metallic path. Other transmission media are contemplated, such as coaxial cables, various types of twisted-pair wire configurations, fiber optic cables, etc. and may also include one or more wireless connections as desired.

The transmission medium 102 enters the home location 104 via a standard network interface device demarcation (D) 108 and then is routed throughout the home location 104. A plurality of phone line connectors 110 are provided, each for enabling extension of the transmission medium 102 for connection to a network device via a compatible connector. For example, the transmission medium 102 may be routed to standard RJ-11 telephone plugs installed throughout the home location 104 to connect computers and telephones using corresponding RJ-11 plugs. Each connector 110 refers to the plug, the jack or both. One or more standard telephones 112 are coupled to the transmission medium 102 within the home location 104, each via a corresponding connector 110. The modem 116 includes at least one port or connector C for coupling to the transmission medium 102 via a connector 110. The connector C may also conform to the RJ-11 standard, although any type of suitable connector is contemplated. A computer system or personal computer (PC) 114 is also provided and coupled to the modem 116 in a standard manner. The modem 116 may comprise an external modem or an internal modem configured as a plug in expansion card. The modem 116 includes an analog modem portion (AM) and a digital modem portion (DM) as further described below. The communication system 100 illustrates a splitterless embodiment in which the home location 104 does not include a Plain Old Telephone Service (POTS) splitter. In this manner, the modem 116 and the telephones 112 communicate on the same transmission medium or physical wires.

The central office 106 is remotely located relative to the home location 104 but coupled to the same transmission medium 102. The central office 106 includes a POTS splitter 120 coupled to the transmission medium 102 and a digital modem interface (DM I/F) 122 coupled to the POTS splitter 120. Although not shown, the POTS splitter 120 includes a high pass filter (HPF) coupled to the DM I/F 122 and a low pass filter (LPF) coupled to a POTS line card 130. In this manner, the DM portion of the modem 116 of the home location 104 may establish a communication link with the DM I/F 122 at the central office 106 via the transmission medium 102 on both sides of the demarcation 108. The DM I/F 122 at the central office 106 may further be coupled to a broadband network 124, which comprises any external network system, such as the Internet or the like. An appropriate Internet Service Provider (ISP) and network router (not shown) could be provided to establish a communication link with the broadband network 124. In this manner, the user at the home location 104 has access to the broadband network 124 via the modem 116, the transmission medium 102 and the DM I/F 122 of the central office 106.

The POTS line card 130, such as a Subscriber Line Interface Circuit (SLIC) device or the like, is coupled to the POTS splitter 120 at the central office 106 for establishing telephonic communications with any of the telephones 112 at the home location 104. Alternatively, the POTS splitter 120 enables telephonic communications with the AM portion of the modem 116 if desired. The POTS line card 130 is coupled to a narrowband network 128 via the public switched telephone network (PSTN). The AM portion of the modem 116 may be used in any manner as is common for analog modems. For example, the AM portion of the modem 116 could be used for sending and receiving facsimiles (faxes) with the appropriate software. It is noted that the AM portion of the modem 116 may also be used to connect to the Internet or the like via the narrowband network 128 via standard analog modem communications. However, if the central office 106 of the telephone company includes the DM I/F 122, then it is preferred to use the DM portion of the modem 116 for establishing data communications with the Internet or other such data networks via the broadband network 124 since it is significantly faster. The AM portion of the modem 116 and the narrowband network 128 are sufficient for fax communications. In this manner, the modem 116 supports both analog and digital communications. In one embodiment, the AM and DM portions of the modem 116 are used in the alternative and not at the same time. However, the modem 116 and the PC 114 may be configured to allow the AM and DM portions to be used simultaneously.

In a more specific embodiment, the DM portion of the modem 116 operates according to Digital Subscriber Loop (DSL) technology, and more particularly to asymmetrical DSL (ADSL). For example, the DM portion of the modem 116 comprises a Remote ADSL Termination Unit (ATU-R) and the DM I/F 122 at the central office 106 comprises a Central office ADSL Termination Unit (ATU-C). Although a full rate ADSL system may be used, another standard is the Universal ADSL (U-ADSL) based on modifications to the current standard document T1.413 Issue 2. The modulation method may be Discrete Multitone (DMT) using up to 128 tones for U-ADSL as compared to up to 256 tones for full rate. It is noted that any other of the various DSL technologies (xDSL) is also contemplated to establish the communication link. Also, the AM portion of the modem 116 operates as a 56K modem, such as according to the K56Flex™ Standard or the ITU V.90 Standard. K56Flex™ is the PCM modem modulation scheme that offers data rates of up to 56K bits per second (bps) downstream (host to client) and data rates of up to 31.2K bps using V.34 upstream. V.90 is the ITU (International Telecommunications Union) standard for PCM data modems for synchronous data signaling rates in the downstream direction from 28K to 56K bps in increments of 1333 bps. Of course, any other type of analog modem protocol may be supported, including any of the standards known to those skilled in the art.

Figure 2:
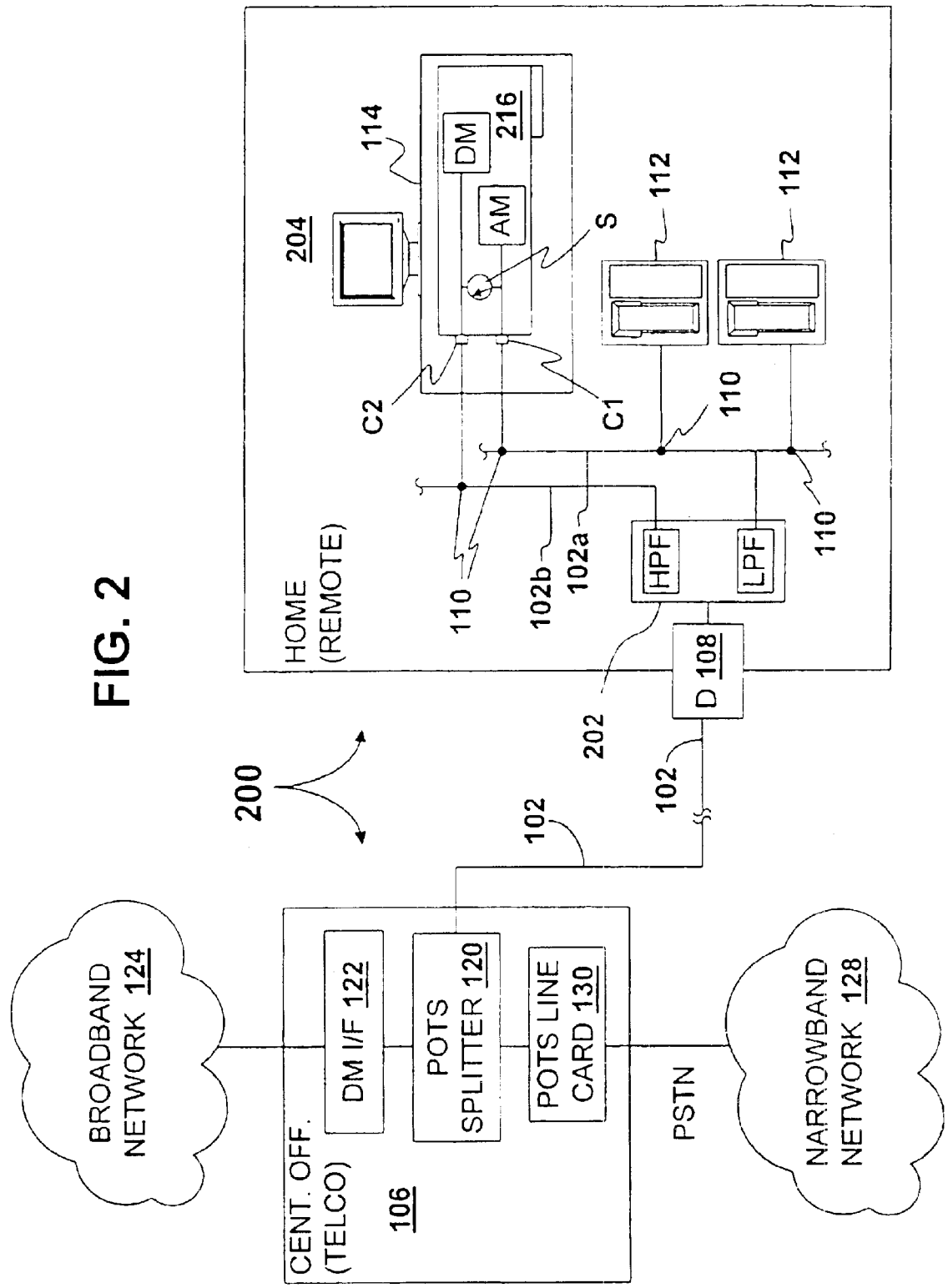
FIG. 2 is a block diagram of another communication system including another modem implemented according to the present invention at a home location with a POTS splitter.

FIG. 2 is a block diagram of another communication system 200 including another combination modem 216 implemented according to the present invention. Similar components assume identical reference numbers. Operation of the communication system 200 is similar to operation of the communication system 100 and operation of the modem 216 is similar to operation of the modem 116, where the modem 216 also includes an AM and a DM portion. The modem 216 incorporates all of the functionality of the modem 116 and includes further connectivity functionality, so that subsequent reference to the modem 216 herein is intended to include the modem 116. The communication system 200 includes a home location 204, where it has been determined that the house wire or POTS loading is not optimum. Consequently, operation of the DM portion of the modem 216 would otherwise be adversely affected if wired in the same manner as the home location 104. The solution for the home location 204 is to add a POTS splitter 202 at the home location 204 that includes a low pass filter (LPF) and a high pass filter (HPF). The transmission medium 102 is provided to the respective inputs of the LPF and HPF of the POTS splitter 202. The output of the LPF is coupled to a first transmission medium 102a and the output of the HPF is coupled to a second transmission medium 102b. In this manner, the POTS splitter 202 separates the transmission medium 102 into two separate and isolated portions 102a and 102b.

The lower frequency transmission medium 102a is coupled to the telephones 112 and to a first connector C1 of the modem 216 via respective connectors 110. The higher frequency transmission medium 102b is coupled to a second connector C2 of the modem 216 via a connector 110. The connectors C1 and C2 may conform to the RJ-11 standard, although any type of suitable connector is contemplated. The connector C1 is internally coupled to the AM portion of the modem 216 and the connector C2 is internally coupled to the DM portion of the modem 216. In this manner, the AM portion of the modem 216 operates via the transmission medium 102a and the DM portion of the modem 216 operates via the transmission medium 102b. In this manner, the DM portion of the modem 216 is isolated from the POTS portion thereby reducing or otherwise eliminating adverse affects of the POTS wiring and communication devices. The modem 216 may also include a switch S, such as a single pole, double throw slide switch or the like, that is coupled between the connector C1 and the AM portion and the connector C2 and the DM portion of the modem 216. The switch S is figuratively shown in the open position to achieve isolation between the connectors C1 and C2 and thus between the AM and DM portions. If the switch S is in the closed position, the connectors C1 and C2 are effectively connected together, so that the modem 216 effectively operates in a similar manner as the modem 116 where either connector C1 or C2 may serve as a single connector C.

Figure 3:
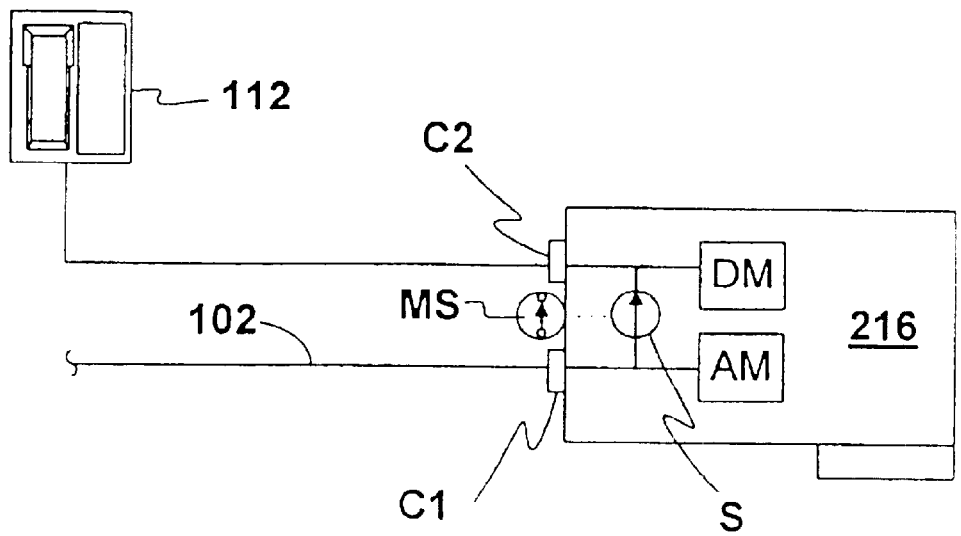
FIG. 3 is a block diagram illustrating the modem of FIG. 2 used at the splitterless home location of FIG. 1.

FIG. 3 is a block diagram illustrating the modem 216 used at the home location 104 in which the transmission medium 102 is coupled to either one of the connectors, such as the connector C1. A POTS telephone 112 is shown coupled to the other connector C2 of the modem 216 for convenience to the user. An external slide switch mechanism MS is figuratively shown to illustrate that the user simply slides the mechanism MS depending upon the mode of operation. In this manner, it is appreciated that the switch S of the modem 216 is opened to achieve isolation between the AM and DM portions when the POTS splitter 202 is utilized. Alternatively, the switch S may be closed in a splitterless environment in which the communication medium 102 carries either or both the low frequency portion (analog) and high frequency portion (digital or xDSL).

Figure 4:
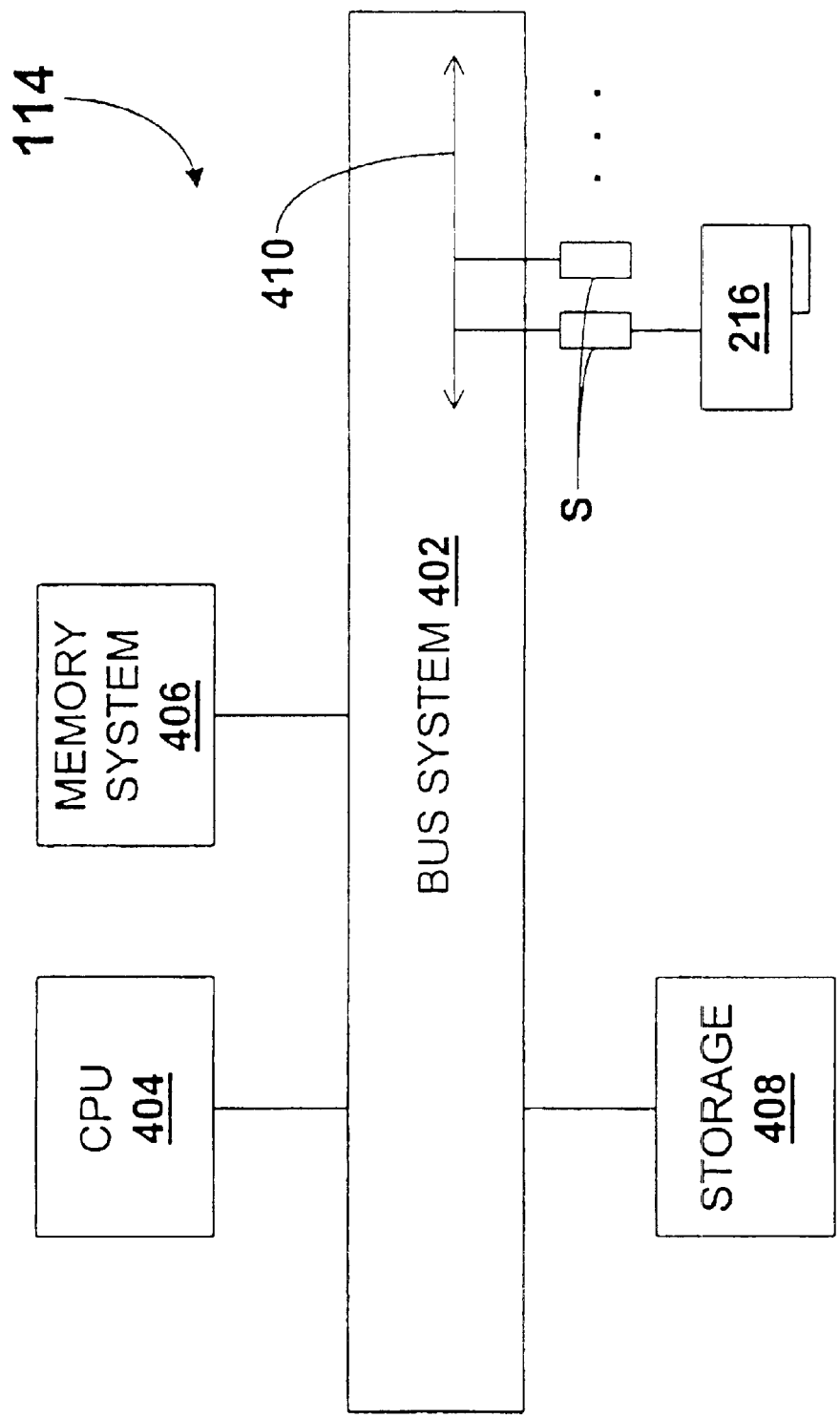
FIG. 4 is a more detailed block diagram of the computer of FIG. 1 coupled to the modem of FIG. 2.

FIG. 4 is a more detailed block diagram of the PC 114 that couples to the modem 216. The PC 114 includes a bus system 402, which includes any combination of PC buses such as one or more processor or host buses, expansion buses, input/output (I/O) buses, etc., and corresponding bus bridges as known to those skilled in the art. The PC 114 includes at least one processor or central processing unit (CPU) 404 coupled to the bus system 402, where the CPU 404 includes corresponding support logic (not shown), such as a level 2 (L2) cache or the like, bus interface circuitry, timing circuitry, etc. The CPU 404 accesses and executes software, programs, device drivers, etc., loaded into a memory system 406. The memory system 406 is shown coupled to the bus system 402, where the memory system 406 may further include volatile memory such as random access memory (RAM) or the like and possibly non-volatile memory such as read only memory (ROM) or the like for purposes of boot up and storing programs for execution by the CPU 404. The PC 114 may also include one or more storage devices or drives, shown collectively as storage 408 coupled to the bus system 402. The storage 408 may include one or more floppy disk drives, hard disk drives, CD ROM drives, tape drives, ZIP drives, etc.

Any one or more of the bus(es) of the bus system 402 conforms to any one or more bus standards, such as the Extended integrated system architecture (EISA) standard, the microchannel architecture (MCA) standard, the peripheral component interconnect (PCI) standard, etc. For example, the bus system 402 includes at least one I/O or expansion bus 410 with one or more slots (S) for receiving and coupling corresponding compatible expansion cards. As shown, the modem 216 is coupled to or otherwise plugged into one of the slots S of the expansion bus 410. In one embodiment, the expansion bus 410 operates according to the PCI standard and the modem 216 is implemented as a PCI card. It is noted, however, that the present invention is not limited to any particular bus standard or configuration and that any appropriate bus that supports the analog and/or digital communication data rate may be used.

Figure 5A:
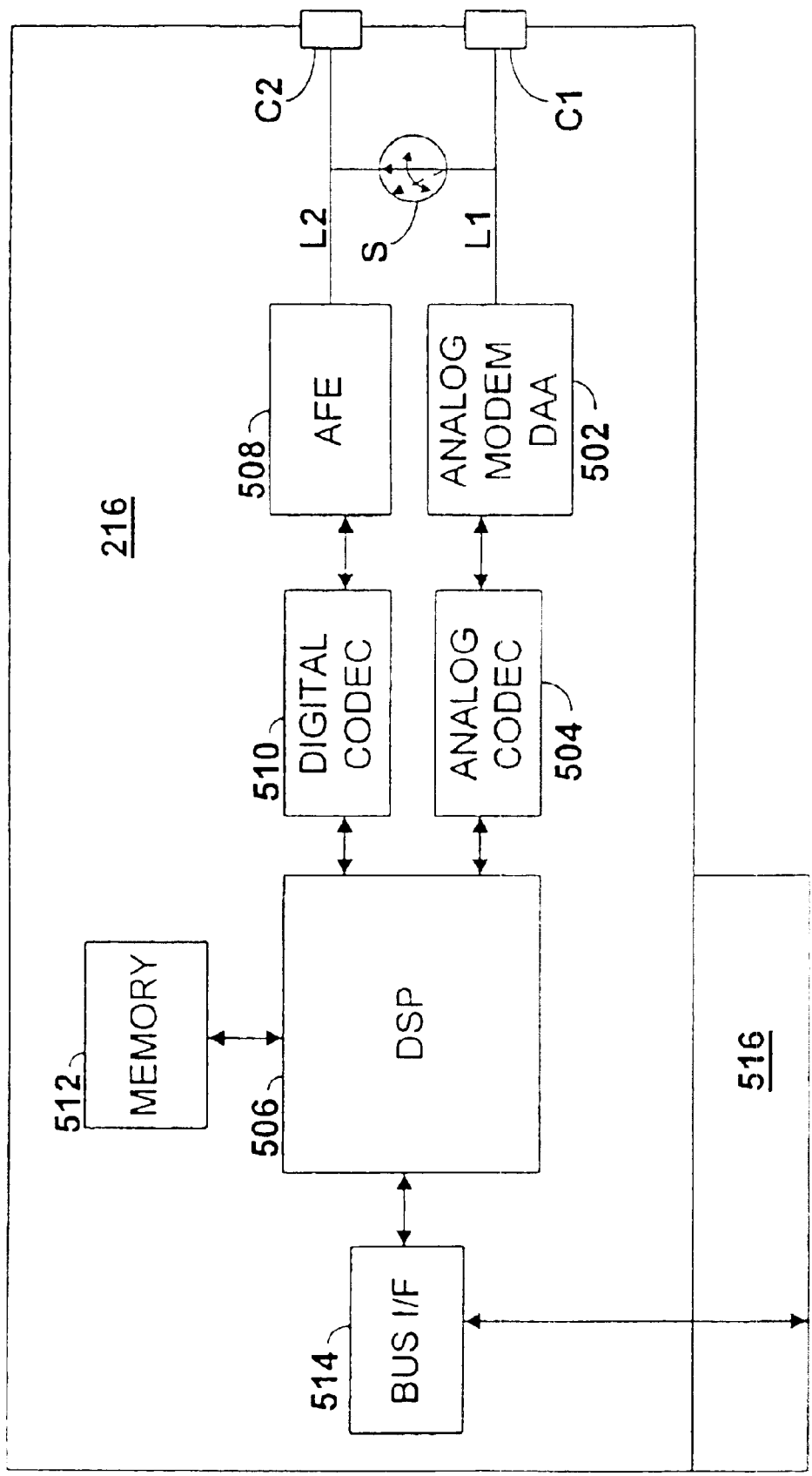
FIG. 5A is a more detailed block diagram of one embodiment of the modem of FIG. 2.

FIG. 5A is a more detailed block diagram of one embodiment of the modem 216 including a single digital signal processor (DSP) 506 for the AM and DM portions. For the analog modem portion, the connector C1 is coupled to an analog modem Data Access Arrangement (DAA) 502 via line L1. A DAA device is typically used to protect the public telephone network from any sudden surges of power or interference from a coupled device. The analog modem DAA 502 interfaces a coder/decoder or codec 504, which interfaces the DSP 506. A codec is generally used to convert analog signals, such as voice signals, into a digital bit stream and vice versa. For the digital portion, the connector C2 is coupled to an analog front end (AFE) 508 via line L2. The AFE 508 performs transceiver functions by receiving and transmitting analog signals and also performs digital filtering. An AFE typically includes a line driver (not shown), a receiver (not shown), and hybrid echo cancellation circuitry (not shown) coupled between the line driver and receiver. The switch S couples the lines L1 and L2 together when closed and isolates the lines L1 and L2 when opened to isolate the analog and digital portions. The AFE 508 interfaces a digital codec 510, which interfaces the DSP 506. The digital codes 510 performs codec functions for digital communications, such as ADSL. The DSP 506 is coupled to supporting memory 512 and to bus interface (I/F) circuitry 514. The bus I/F circuitry 514 is coupled to the expansion bus 410 of the PC 114 via a slot connector 516, which physically interfaces any one of the slots S. For a PCI configuration, the bus I/F circuitry is implemented for PCI operations, the expansion bus 410 is a PCI bus, the slot connector 516 is a PCI slot connector and the slots S are PCI slots.

Figure 5B:
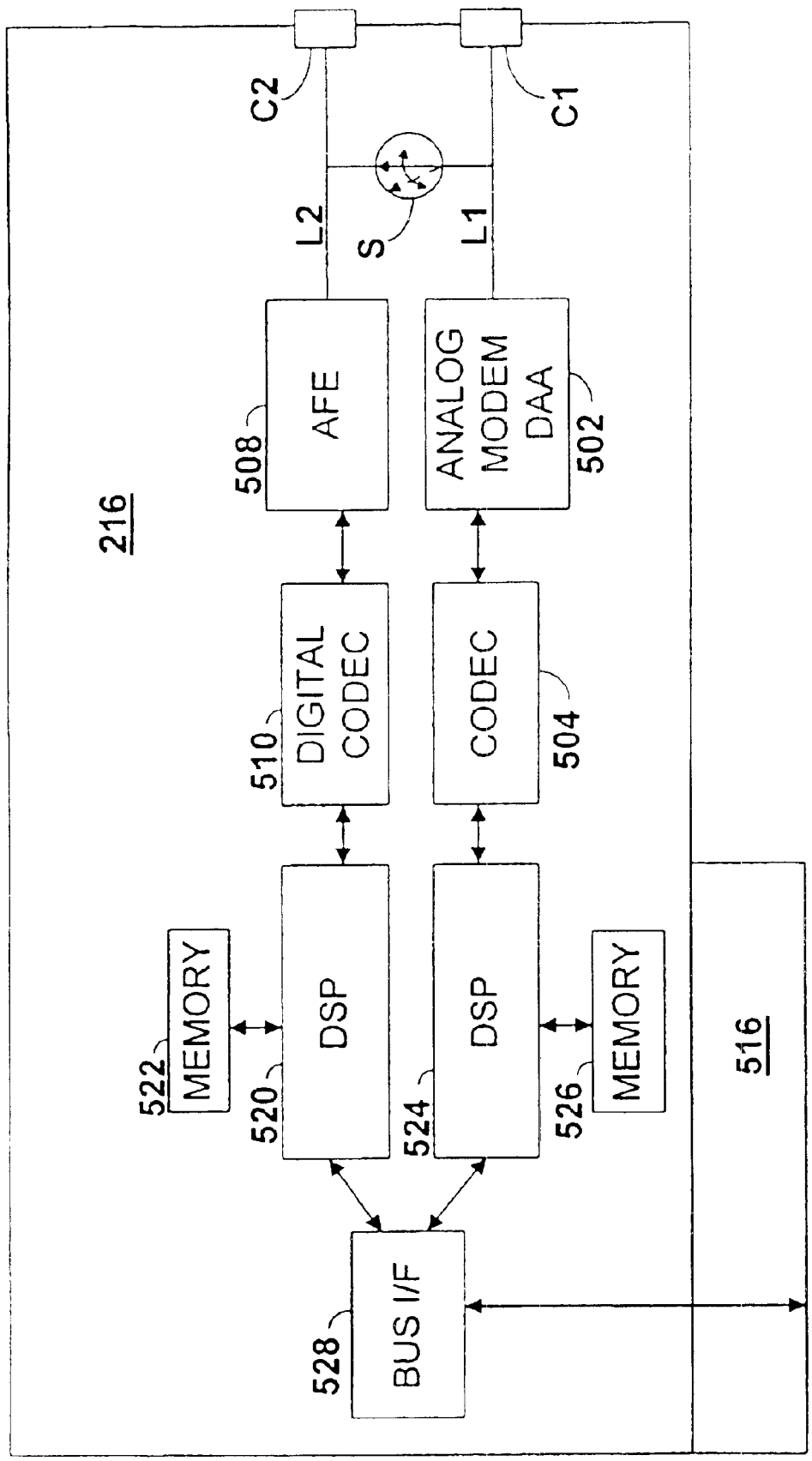
FIG. 5B is a more detailed block diagram of another embodiment of the modem of FIG. 2.

FIG. 5B is a more detailed block diagram of another embodiment of the modem 216 including separate DSPs 520 and 524 for the DM and AM portions, respectively. Similar components or devices assume identical reference numbers. A single memory may be provided for both DSPs 520 or 524 or separate memories 522, 526 may be provided for each. Operation is similar except that the DSPs 520 and 524 are dedicated to the respective DM and AM functions rather than a single DSP, such as the DSP 506, handling all DM and AM processor functions. Of note, both DSPs 520 and 524 interface the expansion bus 410 via a single bus I/F 528.

Figure 6:
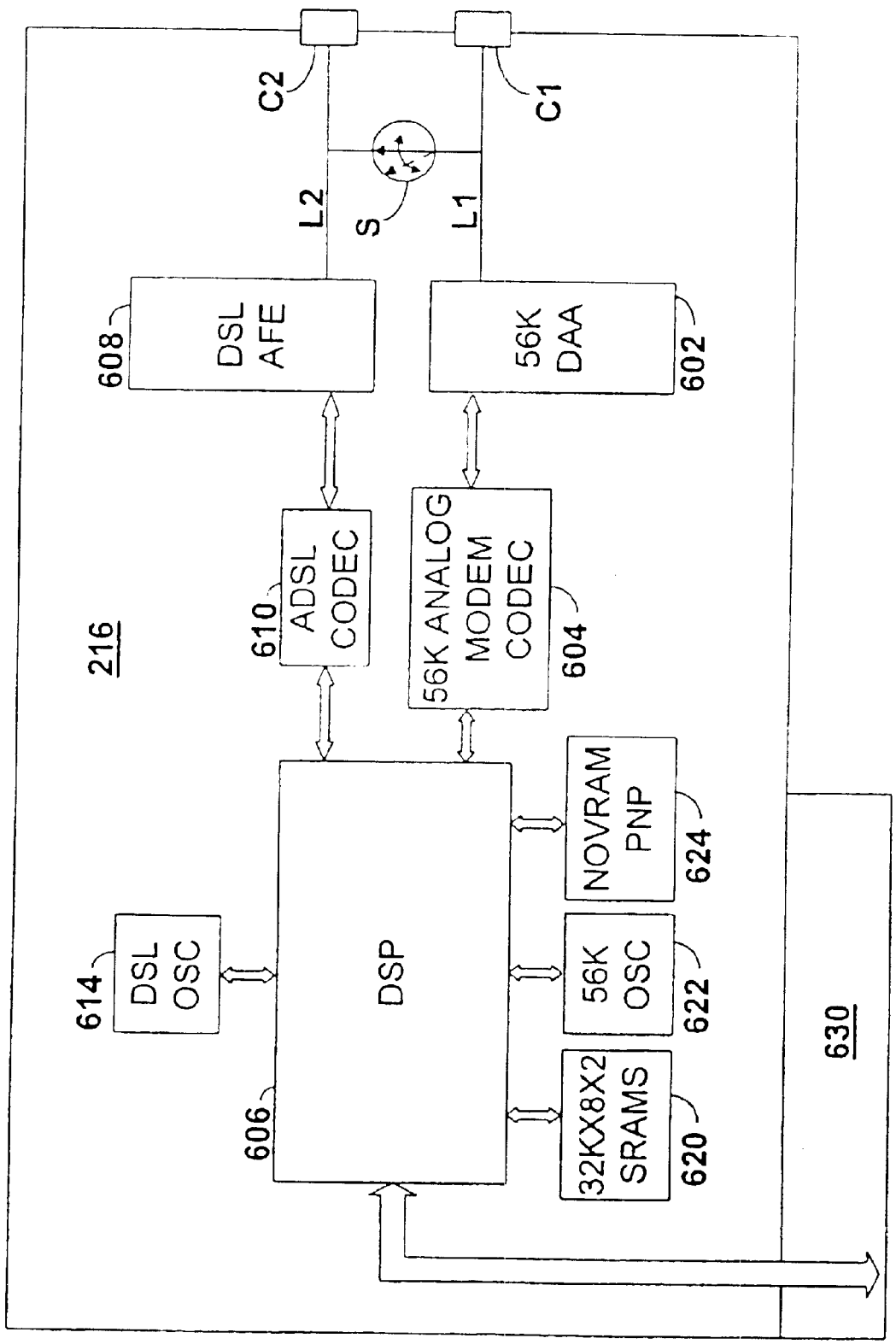
FIG. 6 is a block diagram of a more specific embodiment of the modem of FIG. 2.

FIG. 6 is a block diagram of a more specific embodiment of the modem 216. A DSP 606 is preferably the DSP1690 manufactured by Lucent Technologies (Lucent) which includes a PCI interface core that couples directly to the expansion bus 410 (configured as a PCI bus) via a PCI slot connector 630. A 56K DAA 602 is coupled to the line L1 and interfaces to a 56K analog modem codec 604, such as the CSP1034AH codec by Lucent. The codec 604 interfaces the DSP 606 via a synchronous serial interface. A DSL analog front end (AFE) 608 is coupled to the line L2 and interfaces an ADSL codec 610, such as the T7780 ADSL line interface codec by Lucent, which is an analog interface to the DSP 606 for U-ADSL operations. The ADSL codec 610 is coupled to the DSP 606 via an appropriate interface. A switch S couples the lines L1 and L2 together when closed and isolates the lines L1 and L2 when opened in a similar manner as described previously. A DSL oscillator 614 and a 56K modem oscillator 622 are coupled to the DSP 606 as timing references for U-ADSL and 56K modem functions, respectively. Memory chips, such as synchronous RAMs 620 are provided as external memory for 56K/U-ADSL operations. A nonvolatile memory (NOVRAM) device 624, such as an electrically erasable memory or the like (EEPROM or EEROM, etc.), is provided for purposes of Plug-n-Play (PnP).

Separate line interfaces and codecs are provided for both the analog and digital modem communications, and thus may be operated at the same time. Separate DSPs, such as the DSPs 520 and 524 are capable of being operated at the same time. The DSP of the modem 216, such as the DSP 506 or the DSP 606, may be selected to operate either the analog modem portion or the digital modem portion at any given time. Alternatively, the DSP may be capable of supporting both the analog and digital modem communications at the same time. In this latter embodiment, the bus I/F 514 or the DSP 606 and the expansion bus 410 must also be capable of handling both analog and digital modem communications simultaneously. A PCI bus and corresponding PCI interfaces are more than adequate for handling 56Kbps analog modem communications and ADSL communications simultaneously.

Figure 7:
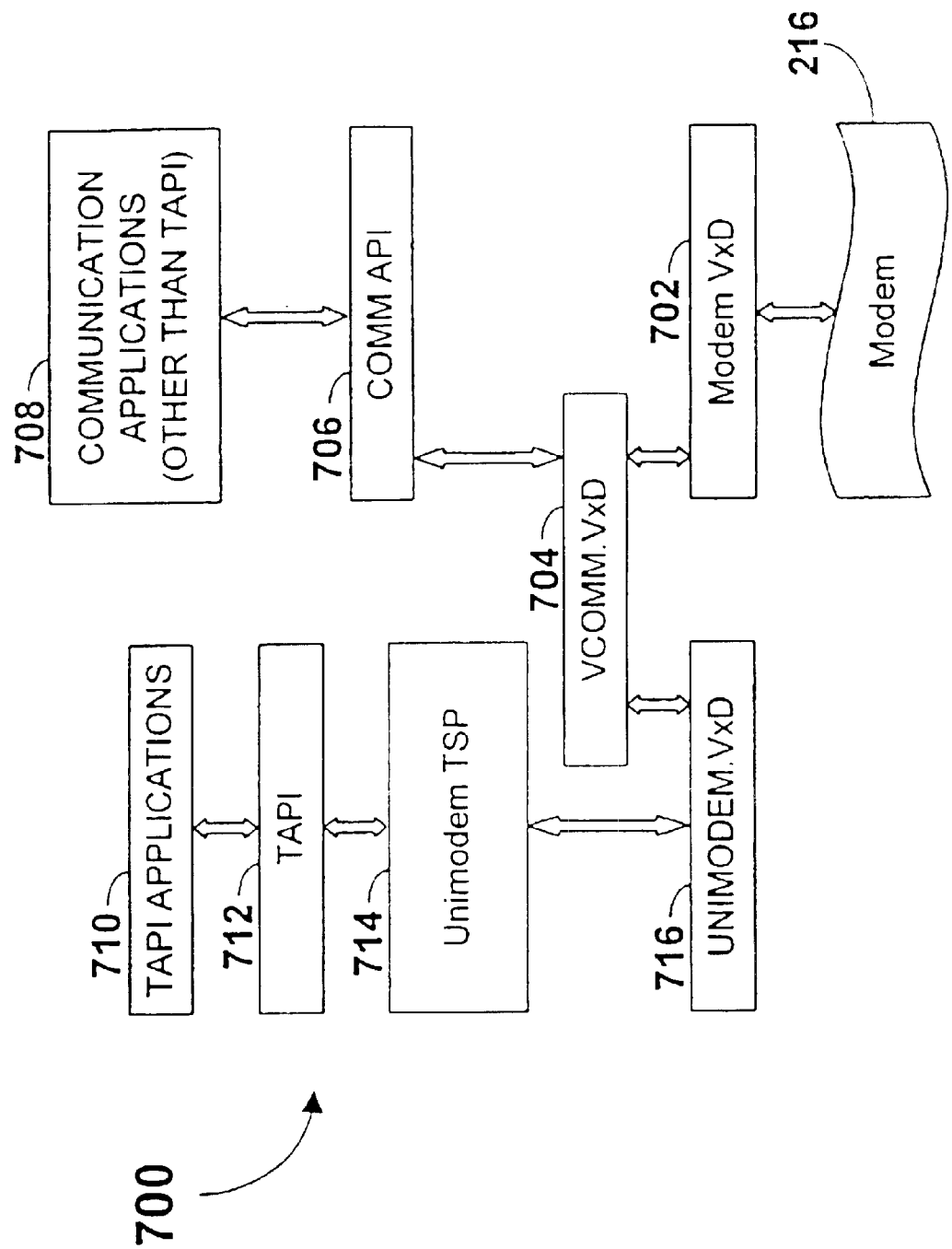
FIG. 7 is a block diagram illustrating one embodiment of an analog modem driver software architecture for the modem of FIG. 2.

FIG. 7 is a block diagram illustrating an exemplary analog modem driver software architecture 700 for interfacing the modem 216 for analog operations. Although the present invention is not limited to any particular software architecture or operation system (O/S), the software architectures illustrated conform to the Windows® operating systems, such as Windows 95®, Windows 98®, Windows NT®, etc. The modem 216 supports local area network (LAN) and wide area network (WAN) connections, such as the Internet, through its network stacks. The modem 216 has at least two sets of drivers for Internet and LAN protocol support, including a first set of modem drivers for analog modem operation, and a second set of network miniport drivers. As shown in FIG. 7, the modem 216 interfaces a modem virtual device driver (V×D) 702 via the expansion bus 410. The modem V×D 702 is registered with Windows® VCOMM V×D 704 as the port driver for the Virtual Communication Architecture (VCOMM), which is a component of the Windows® operating system. Any user COM port open request concerning the modem port, such as through any non-TAPI communication application 708 via the communication application programming interface (COMM API) 706, is passed along to the modem V×D 702 and is handled appropriately.

A port open request may also come from a TAPI (Telephony API) application 710 and TAPI 712 through a Unimodem Telephony Service Provider (TSP) 714 and a Unimodem V×D 716, which interfaces the VCOMM V×D 704. After a successful port open operation, further requests, such as port configuration, sending and receiving data etc., can be handled by the modem V×D 702. The port is closed upon end of modem use, hanging up a call, or disconnecting.

Figure 8:
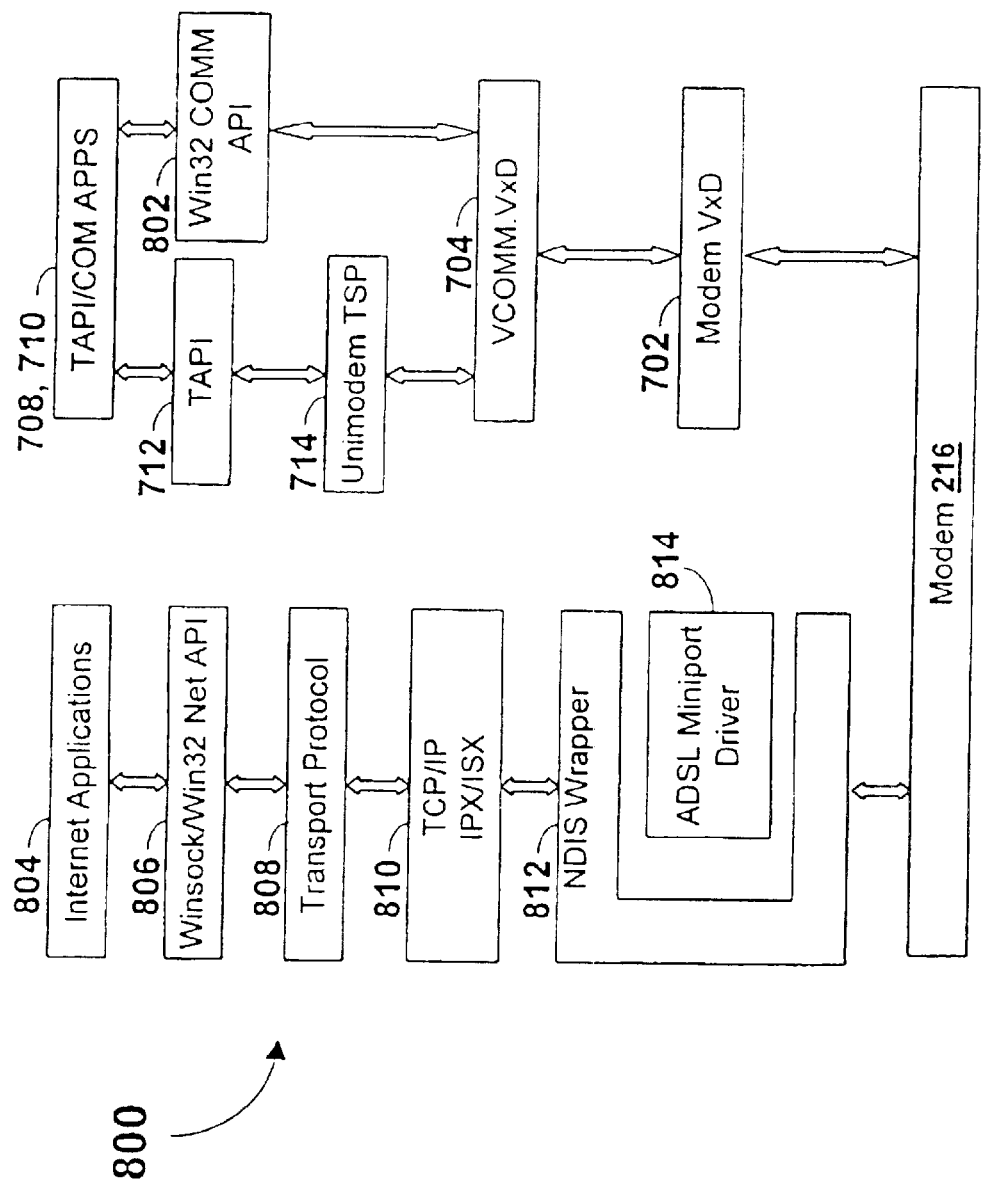

FIG. 8 is a block diagram illustrating one embodiment of an ADSL modem driver software architecture 800 for the modem 216. TAPI communication applications 708 and other communication applications 710 interface the modem 216 via the TAPI 712, the unimodem TSP 714, the VCOMM V×D 704 and the modem V×D 702 in a similar manner as described above for the analog modem driver software architecture 700. TAPI communication applications 708 and other communication applications 710 may alternatively interface the VCOMM V×D 704 via a WIN32 Communication API 802. Internet applications 804 or the like may interface the modem 216 via the Winsock/WIN32 Net API 806, transport and network layer protocols 808 and 810, such as TCP/IP or IPX/ISX (Internet Packet Exchange/Internet Service Exchange) or the like, and an ADSL miniport driver 814 via a Network Driver Interface Specification (NDIS) wrapper 812. The NDIS wrapper 812 provides an interface by which one or more network adapter drivers communicate with one or more underlying adapter cards, with one or more overlying protocol drivers and with an operating system. In the embodiment shown, the ADSL network miniport drivers 814 conform to at least one version of NDIS, such as NDIS 4.0 or NDIS 5.0.

Figure 9:
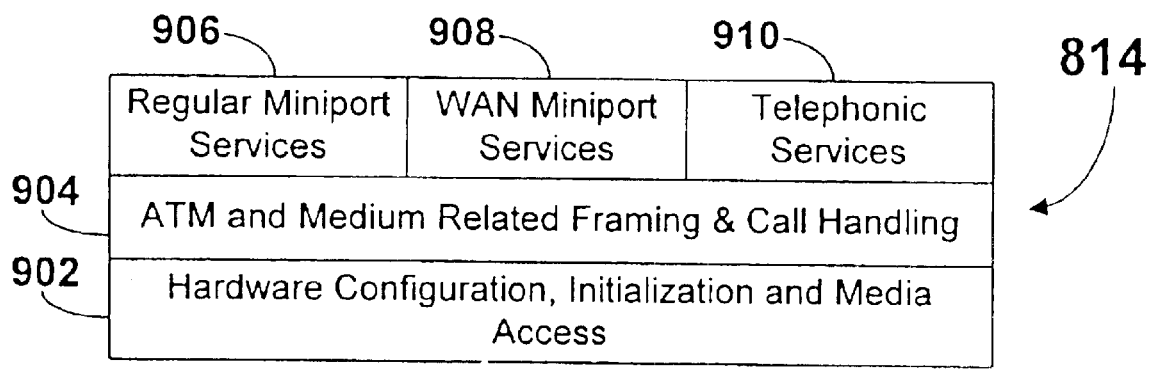
FIGS. 8–12 are block diagrams illustrating several exemplary embodiments of digital modem software architectures for the modem of FIG. 2.
Figure 10:
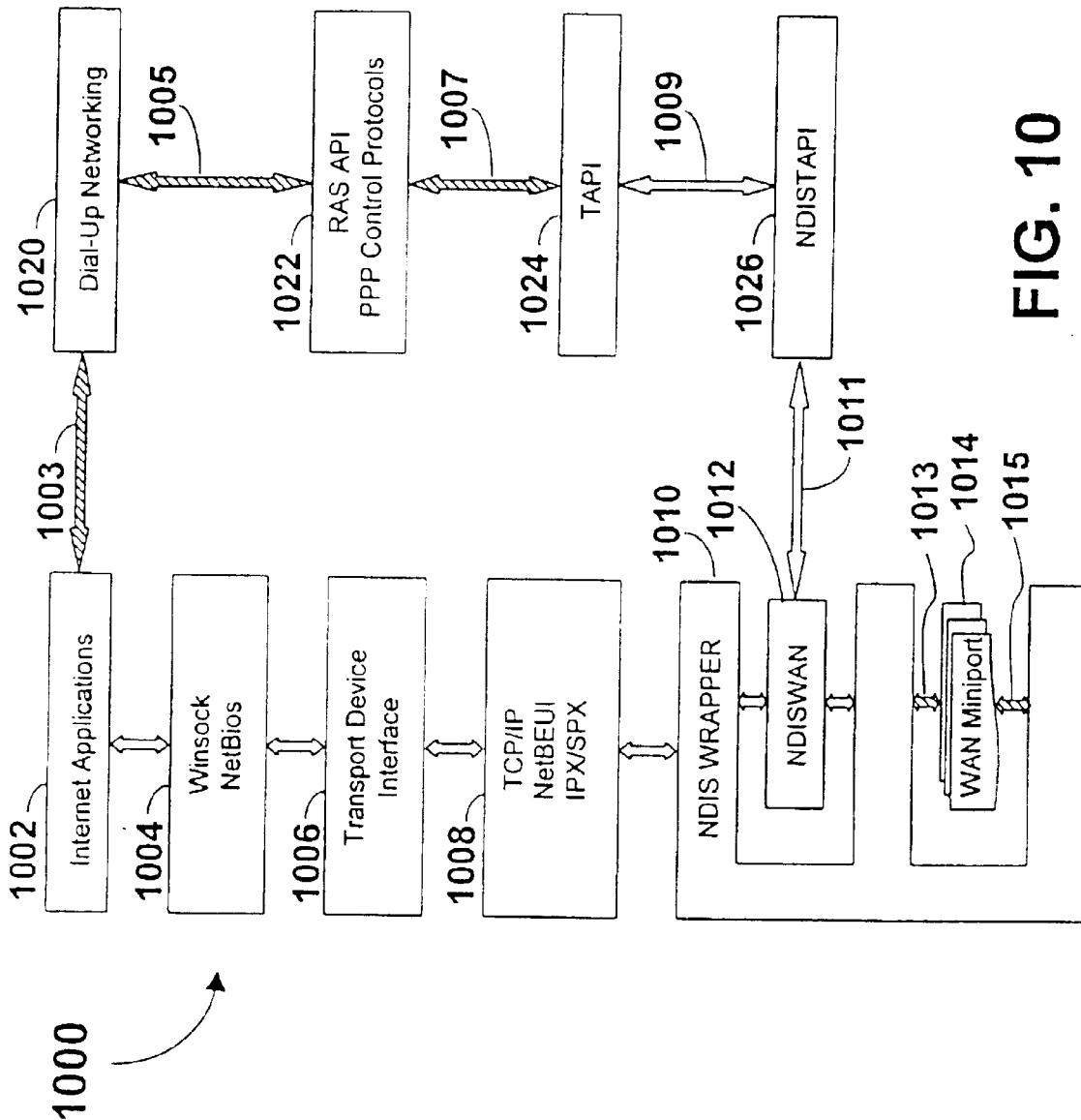

FIG. 9 is a functional block diagram of the ADSL miniport driver 814. In the layered architecture, a bottom layer 902 supports hardware configuration, initialization, and packet sending and receiving (media access). A middle layer 904 handles Asynchronous Transfer Mode (ATM) framing and signaling functions. An upper layer is divided into three functional blocks, including regular miniport services 906 (NDIS), WAN miniport services 908 (NDISWAN) and Telephonic services 910 (NDISTAPI). With this miniport driver architecture, the modem 216 may support PPP-Over-ATM (Point-to-Point Protocol) through current Windows Dial-up-Networking (FIG. 10). PPP is a well established protocol widely used by most Internet Service Providers (ISPs). ATM is a proposed telecommunications standard primarily driven by telecommunications companies not only for Broadband ISDN, but also for U-ADSL as of the proposed T1.413 issue 2 standard by ANSI (American National Standards Institute, Inc.) for telecommunications.

Other software architectures are contemplated for the digital portion functions of the modem 216. For example, FIG. 10 is a functional block diagram of a PPP-Over-ATM software architecture 1000 through current Windows Dial-up-Networking. In this case, there is no native support for an ATM medium so that the miniport provides NDISWAN and telephonic services. Internet applications 1002 interface the modem 216 via Winsock NetBIOS 1004, a Transport Device Interface 1006, TCP/IP or NetBEUI or IPX/SPX (Internet Packet Exchange/Sequenced Packet Exchange) protocol(s) 1008, and NDISWAN 1012 and WAN miniport drivers 1014 via an NDIS wrapper 1010. The WAN miniport drivers 1014 interface the NDIS wrapper 1010 via data flow connections 1013 and 1015. The Internet Applications 1002 interface Dial-Up Networking 1020 via a data flow connection 1003 and Dial-Up Networking 1020 interfaces Remote Access Services (RAS) API and PPP Control Protocols 1022 via a data flow connection 1005. TAPI 1024 interfaces the RAS API and PPP Control Protocols 1022 via a data flow connection 1007. NDISTAPI 1026 interfaces TAPI 1024 via interface 1009 and NDISWAN 1012 via interface 1011. Remaining interfaces are IP/LAN interfaces. Of note, NetBIOS is a transport protocol by IBM® Corp. and NetBEUI (Network Basic Extended User Interface) is an extension of NetBIOS that communicates through NDIS.

Figure 11:
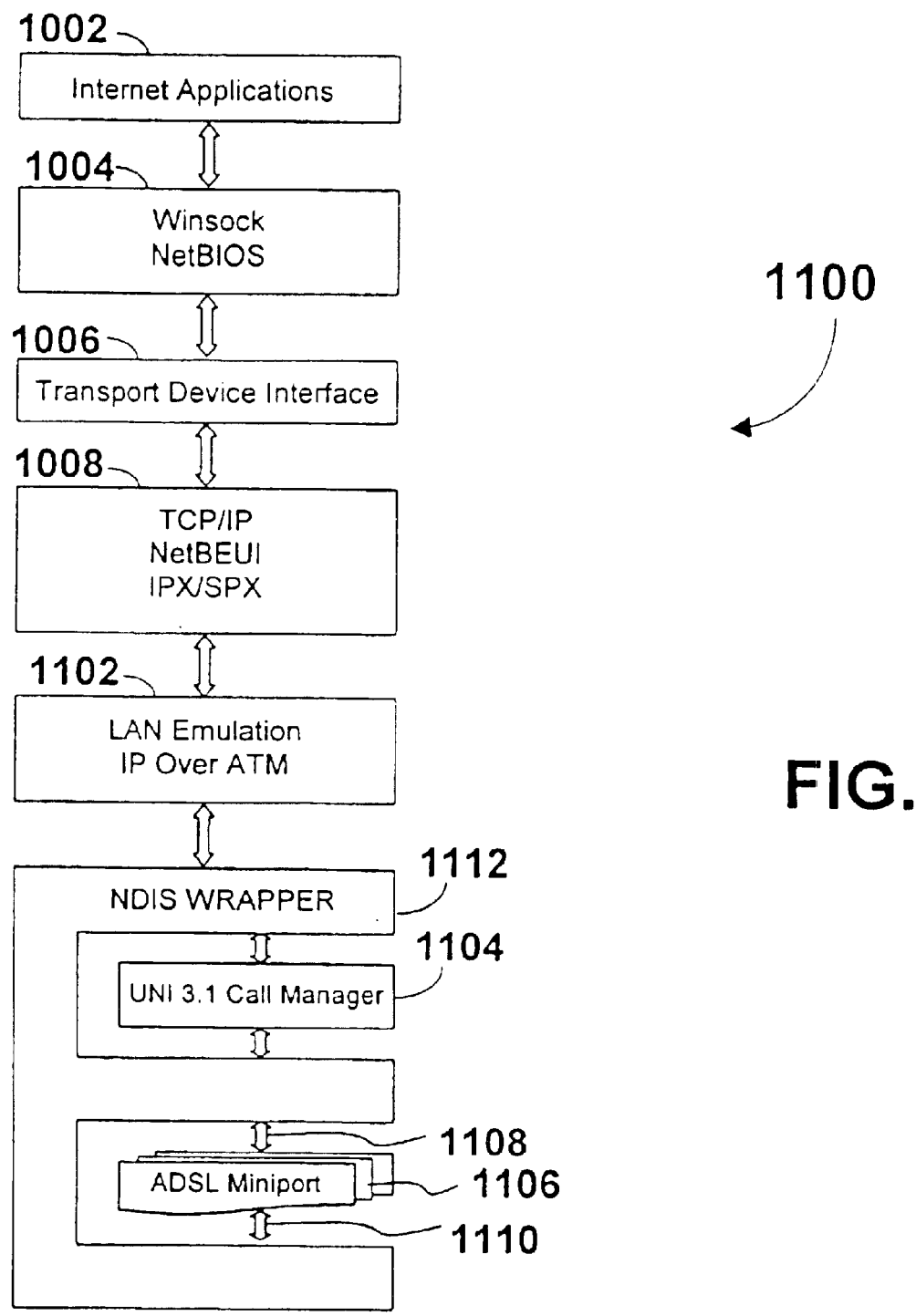

FIG. 11 is a functional block diagram of an IP-Over-ATM software architecture 1100 in which native support for ATM is provided, such as, for example, Windows 98® and NDIS version 5.0. As in FIG. 10, Internet applications 1002 interface the modem 216 via the Winsock NetBIOS 1004, the Transport Device Interface 1006 and the TCP/IP or NetBEUI or IPX/SPX protocol(s) 1008. The TCP/IP or NetBEUI or IPX/SPX protocol(s) 1008 interface UNI 3.1 Call Manager 1104 and ADSL miniport drivers 1106 via an NDIS wrapper 1112. The ADSL miniport drivers 1106 interface the NDIS wrapper 1112 via data flow connections 1108 and 1110. The other interfaces shown are IP/LAN interfaces.

Figure 12:
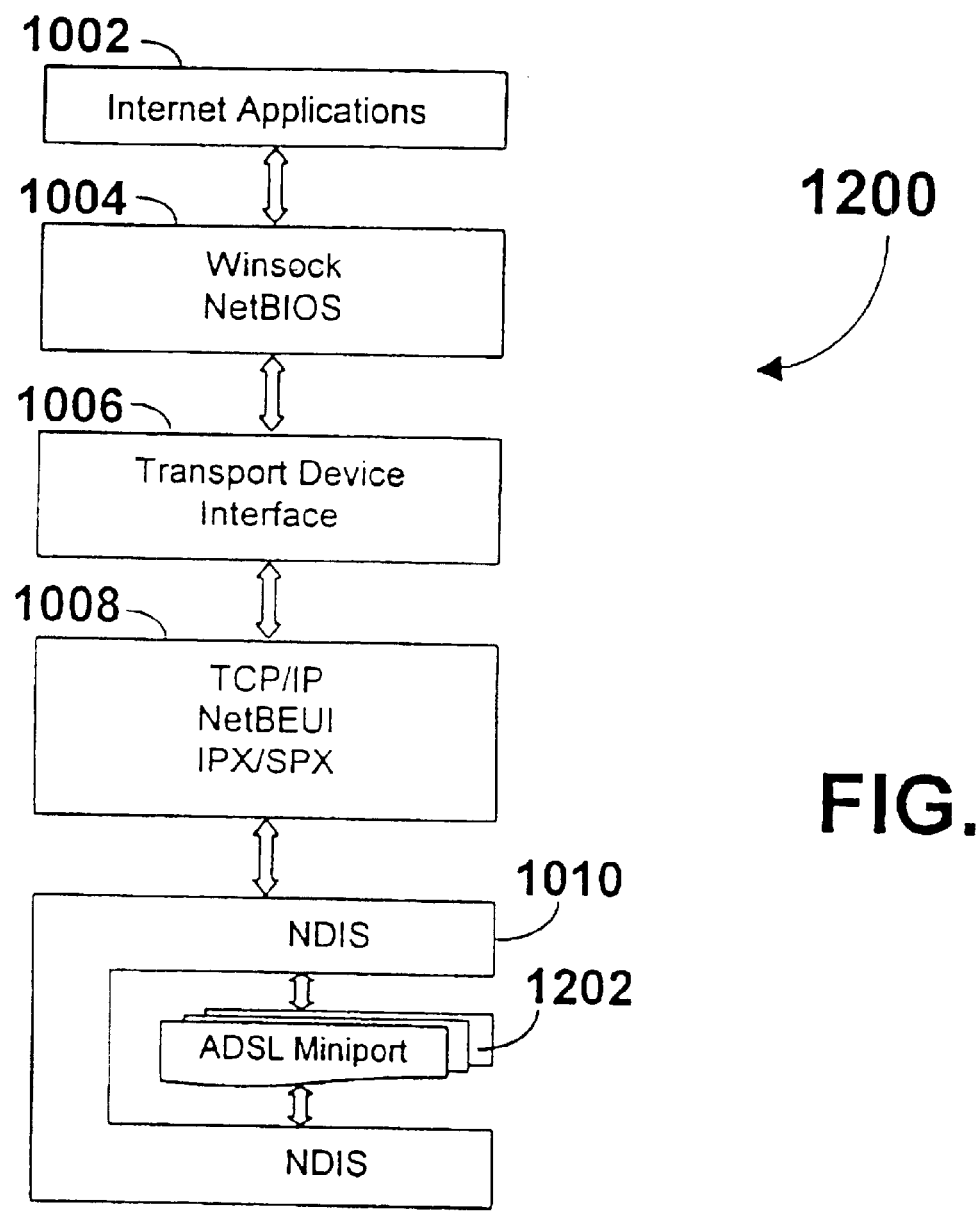

Since not all telephone companies currently have the infrastructure for PPP-Over-ATM support, and a few telephone companies currently have an end-to-end architecture based on an IP-Ethernet-Over-ATM model, the ADSL miniport driver may need to be flexible enough to also provide support for this scenario. FIG. 12 is a functional block diagram illustrating an IP-Over-Ethernet-Over-ATM software architecture 1200 for use with NDIS version 4.0. Internet applications 1002 interface the modem 216 via Winsock NetBIOS 1004, the Transport Device Interface 1006, TCP/IP or NetBEUI or IPX/SPX protocol(s) 1008, and ADSL miniport drivers 1202 via NDIS wrapper 1010. In this case, the ADSL miniport drivers 1202 include a layer for protocol translation to bridge Ethernet to ATM.

It is now appreciated that a combined modem solution according to the present invention offers both analog and digital modem communications using an efficient form factor without wasting PC resources. Depending upon the configuration of the modem and the computer software, the modem may operate as an analog modem, a digital modem, or as both at the same time. A user may use the combination modem to access broadband networks or WANs using the faster ADSL technology and may use the same modem to access narrowband networks, such as via the public switched telephone network (PSTN) or the like, using the traditional analog technology. An example of a desired use of an analog modem is to send and receive facsimiles using the computer or PC.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A combination modem for a computer with an expansion bus, the combination modem communicating via a transmission medium, the combination modem comprising:
    at least one line connector that is configured for coupling to the transmission medium;
    analog modem logic, coupled to the at least one line connector, that is capable of performing analog modem communications via the transmission medium;
    digital modem logic, coupled to the at least one line connector, that is capable of performing digital modem communications via the transmission medium;
    a bus interface that enables communication with the computer via the expansion bus; and
    processing logic coupled to the analog modem and digital modem logic and the bus interface.

2. The combination modem of claim 1, wherein the analog modem logic further comprises:
    a data access arrangement coupled to the at least one line connector; and
    an analog modem codec coupled to the data access arrangement and the processing logic.

3. The combination modem of claim 2, wherein the data access arrangement and the analog modem codec support a data rate of up to approximately 56 kilobits per second.

4. The combination modem of claim 1, wherein the digital modem logic further comprises:
    an analog front end coupled to the at least one line connector; and
    a digital modem codec coupled to the analog front end and the processing logic.

5. The combination modem of claim 4, wherein the analog front end and the digital modem codec operate according to digital subscriber loop technology.

6. The combination modem of claim 4, wherein the analog front end and the digital modem codec operate according to asymmetrical digital subscriber loop technology.

7. The combination modem of claim 4, wherein the analog front end and the digital modem codec operate according to universal asymmetrical digital subscriber loop technology.

8. The combination modem of claim 1, wherein the expansion bus is a peripheral component interconnect bus and wherein the bus interface operates according to peripheral component interconnect.

9. The combination modem of claim 1, wherein the processing logic comprises a digital signal processor.

10. The combination modem of claim 9, wherein the bus interface is incorporated within the digital signal processor.

11. The combination modem of claim 9, wherein the digital signal processor supports simultaneous operation of the analog modem and digital modem logic.

12. The combination modem of claim 11, wherein the digital modem logic operates according to digital subscriber loop technology.

13. The combination modem of claim 1, wherein the at least one line connector comprises:
    a first line connector coupled to the analog modem logic; and
    a second line connector coupled to the digital modem logic.

14. The combination modem of claim 13, further comprising:
    a switch coupled between the first and second line connectors that operates to couple the first and second line connectors together when closed and that operates to isolate the first and second line connectors when opened.

15. The combination modem of claim 13, further including a splitter that divides the transmission medium into first and second transmission mediums, wherein the first transmission medium is coupled to the first line connector and wherein the second transmission medium is coupled to the second line connector.

16. The combination modem of claim 1, wherein the digital modem logic is adapted to operate according to a DSL technology.

17. The combination modem of claim 16, wherein the digital modem logic comprises a DSL codec.

18. The combination modem of claim 16, wherein the digital modem logic comprises an ADSL codec.

19. The combination modem of claim 1, wherein the digital modem logic comprises a digital codec and an analog front end between the at least one line connector and the digital codec.

20. A computer system that is capable of communicating via a transmission medium, comprising:
    a bus system including an expansion bus with a slot;
    a processor coupled to the bus system;
    a memory system coupled to the bus system; and
    a combination modem expansion card plugged into the slot, the combination modem expansion card comprising:
    at least one line connector that is configured for coupling to the transmission medium;
    analog modem logic, coupled to the at least one line connector, that is capable of performing analog modem communications via the transmission medium;
    digital modem logic, coupled to the at least one line connector, that is capable of performing digital modem communications via the transmission medium;
    a bus interface that enables communication with the processor via the expansion bus; and
    signal processing logic coupled to the analog modem logic, the digital modem logic and the bus interface.

21. The computer system of claim 20, wherein the analog modem logic further comprises:
    a data access arrangement coupled to the at least one line connector; and
    an analog modem codec coupled to the data access arrangement and the signal processing logic.

22. The computer system of claim 20, wherein the digital modem logic further comprises:
    an analog front end coupled to the at least one line connector; and
    a digital modem codec coupled to the analog front end and the signal processing logic.

23. The computer system of claim 22, wherein the analog front end and the digital modem codec operate according to asymmetrical digital subscriber loop technology.

24. The computer system of claim 20, wherein the expansion bus comprises a peripheral component interconnect bus and wherein the bus interface operates according to peripheral component interconnect.

25. The computer system of claim 20, wherein the signal processing logic comprises a digital signal processor.

26. The computer system of claim 25, wherein the bus interface is incorporated within the digital signal processor.

27. The computer system of claim 20, wherein the at least one line connector comprises:

a first line connector coupled to the analog modem logic; and a second line connector coupled to the digital modem logic.

28. The computer system of claim 27, further comprising:

a switch coupled between the first and second line connectors that operates to couple the first and second line connectors together when closed and that operates to isolate the first and second line connectors when opened.

29. The computer system of claim 20, further comprising:

analog modem driver software, executed by the processor from the memory system, that cooperates with the analog modem logic to perform the analog modem communications; and digital modem driver software, executed by the processor from the memory system, that cooperates with the digital modem logic to perform the digital modem communications.

30. The computer system of claim 20, wherein the digital modem logic is adapted to operate according to a DSL technology.

31. The computer system of claim 30, wherein the digital modem logic comprises a DSL codec.

32. The computer system of claim 30, wherein the digital modem logic comprises an ADSL codec.

33. The computer system of claim 20, wherein the digital modem logic comprises a digital codec and an analog front end between the at least one line connector and the digital codec.

34. The computer system of claim 20, further comprising a TCP/IP layer coupled to the digital modem logic.

35. The computer system of claim 20, wherein the signal processing logic supports simultaneous operation of the analog modem logic and digital modem logic.

* * * * *